April 4, 1967     J. C. MARSHALL ETAL     3,312,539
BRAZING ALLOYS FOR TUNGSTEN AND MOLYBDENUM
Filed Sept. 11, 1964
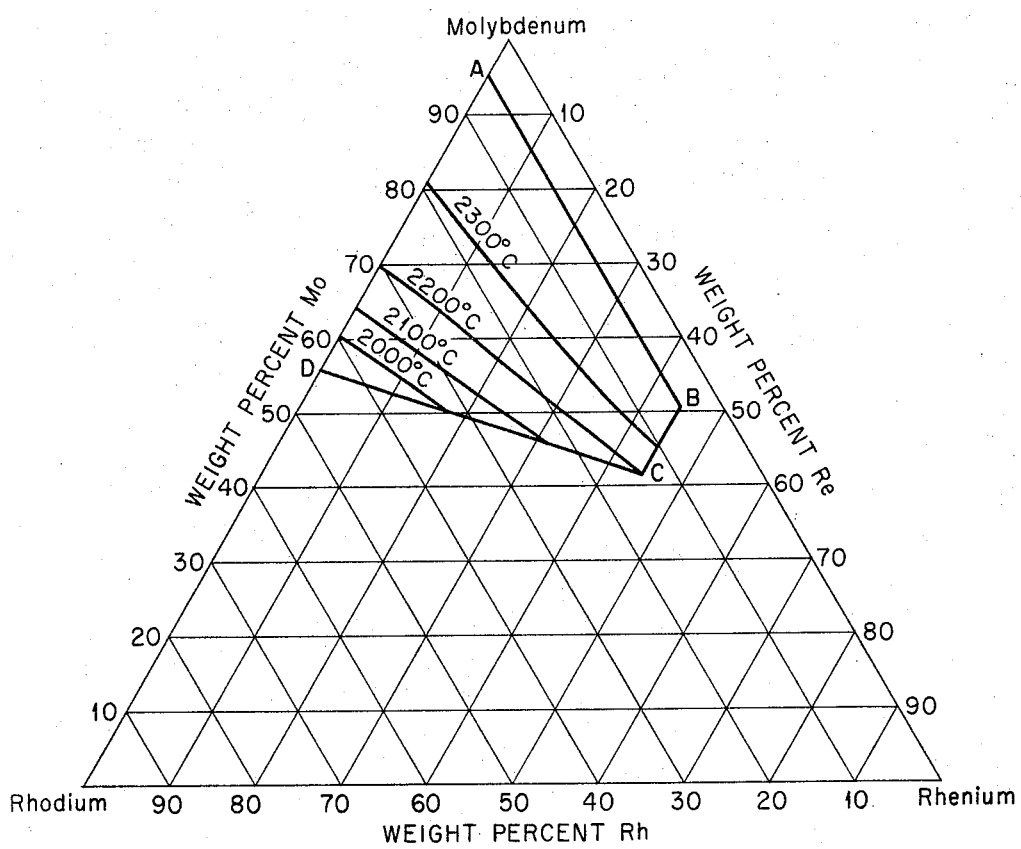
INVENTORS.
James C. Marshall
BY    Harlos G. Smith
ATTORNEY.

3,312,539
BRAZING ALLOYS FOR TUNGSTEN
AND MOLYBDENUM
James C. Marshall and Harlos G. Smith, Cincinnati, Ohio, assignors to the United States of America as represented by the United States Atomic Energy Commission
Filed Sept. 11, 1964, Ser. No. 395,967
1 Claim. (Cl. 29—198)

This invention relates to brazing of refractory metals and more particularly to brazing alloys for joining tungsten, molybdenum and their alloys.

The refractory metals tungsten and molybdenum and their alloys are useful for high-temperature applications in the nuclear energy and space fields. Many of these applications require sealing or closure joints and/or structural joints for attaching to support hardware. Tungsten and molybdenum have been joined by welding and diffusion bonding as well as brazing, but numerous joint configurations and tolerances are encountered such that brazing is the only practical method.

Satisfactory brazing alloys are available for lower temperatures, but not for the temperature range of interest for certain nuclear reactor components, that is, 1950° C. to 2500° C. At these temperatures available brazing alloys tend to erode the base metal or exhibit poor flow characteristics due to volatilization of alloy constituents during brazing. It is desired to provide brazing alloy systems which allow selection of a particular composition for a given temperature within this range. Other desired features are a rapid increase in remelt temperature at the joint to provide high-temperature service capability and minimum erosion of the base metal.

It is, therefore, an object of this invention to provide a brazing alloy system for joining tungsten, molybdenum and alloys containing a predominant proportion thereof.

Another object is to provide a brazing alloy system for said metals which allows selection of a particular brazing temperature within the range of 1950° C. to 2500° C.

Another object is to provide a method of brazing tungsten, molybdenum and their alloys at a temperature of 1950° C. to 2500° C.

Other objects and advantages of this invention will be appparent from the following detailed description and claims.

In accordance with our invention tungsten, molybdenum and alloys containing a predominant proportion thereof are joined by brazing with an alloy of the composition 42 to 95 weight percent molybdenum, 5 to 44 weight percent rhodium and 0 to 45 weight percent rhenium, said alloy composition being further limited to the area bounded by ABCD in the accompanying figure. This alloy system allows selection of a brazing temperature in the range of 1950° C. to 2500° C. Erosion of base metal by these alloys is slight, and increase in the remelt temperature at the joint is relatively rapid so that service at temperatures up to 2500° C. is facilitated.

The brazing alloy compositions included within the scope of this invention are depicted graphically as the area bounded by ABCD in the accompanying figure, which is a ternary diagram of the molybdenum-rhenium-rhodium system. Lines of constant brazing temperature are shown within the area covered. Compositions for a given brazing temperature may be selected by reference to these lines.

The brazing alloy compositions are limited as described above because at higher molybdenum concentrations the melting point does not differ significantly from the melting point of molybdenum, and lower proportions of molybdenum together with higher proportions of rhenium and/or rhodium result in the formation of excessive amounts of intermetallic phases.

The brazing alloys within the scope of this invention may be fabricated by conventional powder metallurgy techniques. Brittleness in these alloys, which requires that they be handled in powder form, does not necessarily cause brittleness in the resulting joint.

Brazing with these alloys is effected by positioning the parts to be joined in abutting relationship with the brazing alloy disposed at the joint and heating to brazing temperature under non-oxidizing conditions. An atmosphere of reducing gas such as hydrogen, an inert gas or vacuum may be employed. Complete flow of the brazing alloy at the joint surface is normally obtained by holding at temperature for a period of about 5 minutes. Thicker or larger parts may require a longer heating period. The assembly is then cooled in the absence of oxygen.

The brazing alloy system and method described above are applicable to joining tungsten, molybdenum and alloys containing a predominant proportion, that is, over 50 weight percent, thereof to themselves and one another. Examples of alloys which may be joined by this means are tungsten-26 weight percent rhenium and molybdenum-50 weight percent rhenium.

Our invention is further illustrated by the following specific example.

EXAMPLE

A series of brazing tests was conducted using alloys in the system described above. In each test a specimen of brazing alloy was placed adjacent the joint line of a tungsten "T" section. The "T" section assembly was then heated in a resistance furnace to 1650° C. in helium. The helium was purged out with hydrogen at this temperature and the "T" section was heated to a predetermined temperature, held for five minutes, and cooled to 1650° C. in the hydrogen atmosphere. At this time the hydrogen was purged by helium and cooling was continued to room temperature. A heating rate of 100° F. per minute was normally maintained. The "T" sections were examined visually for extent of melting and flow and metallographically for fillet porosity, cracking and erosion. These tests were repeated in 25–50° C. intervals until the brazing temperature was determined.

The brazing temperature for the various alloy compositions may be seen by reference to the following table.

Table.—Brazing alloys in the Mo-Re-Rh system

| Composition, weight percent: | Brazing temperature, ° C. |
|---|---|
| Mo–15Rh | 2350 |
| Mo–20Rh | 2300 |
| Mo–33Rh | 1950 |
| Mo–43Rh | 1950 |
| Mo–10Re–33Rh | 1950 |
| Mo–10Re–20Rh | 2300 |
| Mo–20Re–20Rh | 2250 |
| Mo–20Re–15Rh | 2350 |
| Mo–20Re–27Rh | 2150 |
| Mo–30Re–15Rh | 2300 |
| Mo–30Re–20Rh | 2175 |
| Mo–45Re–12Rh | 2275 |

A sound joint was obtained for each of these alloys, and penetration of the base metal by the brazing alloy was less than 0.003 inch in each case.

The above example is merely illustrative and is not to be understood as limiting the scope of our invention which is limited only as indicated by the appended claim.

Having thus described our invention, we claim:

A composite structure comprising at least two structural portions of refractory metals and alloys selected from the class consisting of molybdenum, tungsten, and alloys containing predominant proportions thereof joined to one another by a brazing alloy consisting of 42 to 95 weight percent molybdenum, 5 to 44 weight percent rhodium, and up to 45 weight percent rhenium, the joint formed between the structural portions by the brazing alloy being characterized in having a remelt temperature greater than the melting point of the brazing alloy.

References Cited by the Examiner

UNITED STATES PATENTS

| | | | |
|---|---|---|---|
| 1,647,301 | 11/1927 | Ledig | 75—176 |
| 2,844,868 | 7/1958 | Cline et al. | 29—504 |
| 3,110,101 | 11/1963 | Kieffer | 75—176 X |
| 3,220,828 | 11/1965 | Kaarlela | 75—176 X |

OTHER REFERENCES

Hansen, Constitution of Binary Alloys, McGraw-Hill Book Co., New York, 1958, page 972, relied on.

DAVID L. RECK, *Primary Examiner.*

C. N. LOVELL, *Assistant Examiner.*